United States Patent
Kanamori et al.

(10) Patent No.: US 6,894,227 B2
(45) Date of Patent: May 17, 2005

(54) INSULATED ELECTRIC WIRE

(75) Inventors: Yasuo Kanamori, Susono (JP); Norio Kikuchi, Susono (JP)

(73) Assignee: Yazaki Corporation, Tokyo (JP)

(*) Notice: Subject to any disclaimer, the term of this patent is extended or adjusted under 35 U.S.C. 154(b) by 120 days.

(21) Appl. No.: 10/474,456

(22) PCT Filed: Apr. 9, 2002

(86) PCT No.: PCT/JP02/03548
§ 371 (c)(1),
(2), (4) Date: Apr. 14, 2004

(87) PCT Pub. No.: WO02/083789
PCT Pub. Date: Oct. 24, 2002

(65) Prior Publication Data
US 2004/0168820 A1 Sep. 2, 2004

(30) Foreign Application Priority Data
Apr. 10, 2001 (JP) .................... 2001-111686

(51) Int. Cl.$^7$ .................................. H01B 3/00
(52) U.S. Cl. .................... 174/110 R; 525/88; 526/348
(58) Field of Search .................. 174/110 R, 110 SR; 524/505; 525/88, 207; 526/348

(56) References Cited

FOREIGN PATENT DOCUMENTS

| EP | 472946 A | 3/1992 |
|---|---|---|
| JP | 6-283030 A | 8/1994 |
| JP | 8-27238 A | 1/1996 |
| JP | 2000-251538 A | 9/2000 |

*Primary Examiner*—Chau N. Nguyen
(74) *Attorney, Agent, or Firm*—Sughrue Mion, PLLC

(57) ABSTRACT

An insulated electric wire wherein a conductor is coated with a resin composition having a modulus of elasticity in flexure of not more than 2,00 MPa, good insulating property, water resistance, oil resistance, bending property, anti-scrape property, and resistance against deformation by heating.

6 Claims, 2 Drawing Sheets

CONDUCTOR    INSULATOR

INSULATOR

CONDUCTOR

CONDUCTOR   INSULATOR   BRAID SHIELD   SHEATH

PRESSURIZATION OF 150g

TEST PIECE   PARALLEL PLATE CONDUCTOR

INSULATED ELECTRIC WIRE

FIELD OF THE INVENTION

The present invention relates to a novel insulated electric wire where resin of a polypropylene type is used as an insulating material. More particularly, it provides an insulated electric wire which is able to achieve the same as or, in some cases, even better characteristic than an insulated electric wire using a soft vinyl chloride resin (hereinafter, may be referred to as PVC) and also has an excellent productivity by extrusion molding.

BACKGROUND ART

With regard to an insulated electric wire which is constituted by coating a conductor with an insulating resin, that where PVC is used as a coating material has been widely known. The above-mentioned insulated electric wire has excellent characteristics such as resistance against dielectric breakdown and flexibility due to excellent insulation and flexibility of a soft vinyl chloride resin used as a coating material and, moreover, it has good water resistance and oil resistance whereupon its has been frequently used for household use and for automobiles.

With respect to the insulated electric wire using PVC however, development for insulated electric wire using no PVC has been developed from the consideration on environmental load.

As to the above-mentioned insulated electric wire using no PVC, various ones using polyolefin resin having excellent characteristics in insulation, water resistance and oil resistance have been proposed.

Among them, that where soft polyolefin mainly comprising an elastomer containing a lot of ethylene unit for achieving flexibility is used as a coating material is the mainstream.

However, the above-mentioned soft polyolefin contains a lot of ethylene unit and, therefore, there is a problem that heat resistance lowers and resistance of the resulting insulated electric wire against deformation by heating is deteriorated. There is another problem that, due to insufficient rubbery characteristic of the resin, working ability upon connection of the insulated electric wire using such a soft polyolefin is deteriorated.

Further, in the above-mentioned soft polyolefin used for the above-mentioned insulated electric wire, an inorganic filler is usually compounded for a purpose of enhancing the mechanical strength of the resulting insulated electric wire and giving flame retardant property. However, the insulated electric wire prepared using the resin composition compounded with the inorganic filler is apt to generate microcrazes and has poor resistance against whitening by bending. In addition, the above-mentioned whitening phenomenon lowers the discriminating power of colored wire and causes thermal deterioration in a heat-resisting use for a long period.

Further, the above-mentioned soft polyolefin has another problem of lowering of abrasion resistance by compounding of the inorganic filler. Especially when the modulus of elasticity in flexure of the soft polyolefin is adjusted to not more than 2,000 MPa for achieving the flexibility, scraping property of the insulated electric wire significantly lowers.

In order to improve the abrasion resistance of molded products comprising soft polyolefin compounded with an inorganic filler, there has been proposed a resin composition where the soft polyolefin resin is modified with an acid so that an organic base is bonded. However, the actual current situation is that an effect of improving the scraping property is insufficient and that resistance against deformation by heating is not achieved.

On the other hand, in the manufacturing steps of insulated electric wire, the soft polyolefin and the above-mentioned PVC usually have a big swell ratio and, in molding an insulated electric wire by means of an extrusion molding, a melt fracture phenomenon is apt to be generated in a region of a low shear rate and the productivity is poor.

Accordingly, an object of the present invention is that, in an insulated electric wire where a soft polyolefin composition containing the above-mentioned inorganic filler is used as a coating material, there is provided an insulated electric wire in which good insulation, water resistance and oil resistance of the polyolefin are retained, bending property, resistance against scrape, resistance against deformation by heating and resistance against whitening by bending are still improved and productivity is good as well.

DISCLOSURE OF THE INVENTION

The present inventors have carried out intensive studies for solving the above problems and, as a result, they have found that all of such problems are able to be solved when a mixture of microblend of polypropylene with a propylene-ethylene random copolymer mainly comprising propylene unit having a specific crystallinity distribution as measured by a temperature-rising elution fractionation method and modified microblend where a part of the microblend is acid-modified and a composition prepared by using an ion cross-linking filler are used as insulating materials for coating a wire in an insulated electric wire whereupon the present invention has been achieved.

Thus, the present invention relates to an insulated electric wire, characterized in that, a conductor is coated with an insulating material which substantially comprises a resin composition comprising the following components (A), (B) and (C) and has a modulus of elasticity in flexure of not more than 2,000 MPa.

(A) 100 parts by weight of a mixture of a microblend and a modified microblend, wherein the microblend comprises 1 to 70% by weight of polypropylene and 99 to 30% by weight of a propylene-ethylene random copolymer comprising 15 to 50 mol % of ethylene polymerization unit and 85 to 50 mol % of propylene polymerization unit, and wherein the total eluted components fractionated by a temperature-rising elution fractionation method using o-dichlorobenzene as a solvent comprises (a) 20 to 80% by weight of a component eluted at $-40°$ C. or higher but lower than $+20°$ C., (b) 10 to 70% by weight of a component eluted at $+20°$ C. or higher but lower than $+100°$ C. and (c) 1 to 40% by weight of a component eluted at $+100°$ C. or higher, wherein the sum of the component (a), the component (b) and the component (c) is 100% by weight, wherein the modified microblend is prepared by bonding an organic acid group to the microblend, wherein concentration of the organic acid group in the mixture is 0.01 to 1 mmol per 1 g of the total microblend, and the total microblend contains 10 to 90% by weight of a component eluted at $-40°$ C. to $+30°$ C. in the total eluted components fractionated by the temperature-rising elution fractionation method using o-dibromobenzene as a solvent, (B) not more than 700 parts by weight of polypropylene, and (C) 5 to 200 parts by weight of an ion cross-linking filler based on 100 parts by weight of the total amount of the component (A) and the component (B).

Incidentally, in the present invention, the modulus of elasticity in flexure is a value measured in accordance with JIS K 7203.

The temperature-rising elution fractionation method used in the present invention is a means for analyzing the composition of crystalline polymers such as polyolefin or the distribution of stereoregularity and non-crystallinity thereof and is carried out according to the following operations. Thus, at first, a solution of a microblend of high temperature is introduced into a column filled with a filler such as diatomaceous earth or glass beads and the column temperature is gradually descended whereby components are successively crystallized on the surface of the filler starting from the component having high melting point. After that, the column temperature is gradually raised whereby the components are successively eluted starting from that having low melting point to collect. In the present invention, the descending rate of the column temperature in the above measurement is made 2° C./hour. A rising rate of the column temperature is made 4° C./hour.

A specific operation method is fully described in *Journal of Applied Polymer Science; Applied Polymer Symposium*, 45, 1–24 (1990). In the fractionation of the copolymer composition according to the present fractionation method, a resin composition which is amorphous or is of very low crystallinity is fractionated at the temperature area of a relatively low temperature of not higher than ordinary temperature and, as the eluting temperature rises, component having a high crystallinity is fractionated. Amount of each of the fractionated components is able to be calculated from an elution curve where eluting temperature is on an abscissa while integrated weight rate is on an ordinate.

DETAILED DESCRIPTION OF THE INVENTION

Figure 1:
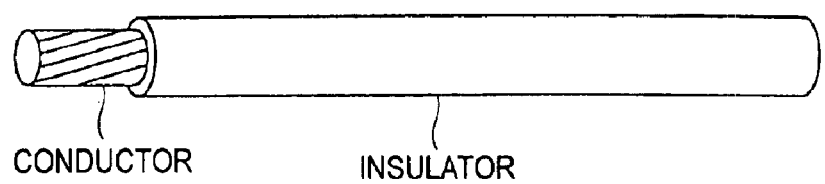
FIG. 1 is an oblique view showing an embodiment (a single wire) of the insulated electric wire of the present invention.

In the coating material for the insulated electric wire according to the present invention, it is important that the microblend is a resin which satisfies the following requirements at the same time.

(1) The rate of the eluted component of −40° C. to +30° C. occupying in the total eluted components fractionated by a temperature-rising elution fractionation method using an o-dibromobenzene solvent is 10 to 90% by weight or, preferably, 30 to 80% by weight; and (2) It comprises 1 to 70% by weight or preferably 1 to 40% by weight of polypropylene and 99 to 30% by weight or preferably 99 to 60% by weight of a propylene-ethylene random copolymer of 15 to 50 mol % or preferably 15 to 40 mol % of ethylene polymerization unit and 85 to 50 mol % or preferably 85 to 60 mol % of propylene polymerization unit.

Thus, the characteristic of the above-mentioned microblend is that the component which is eluted at low temperature is ensured in a sufficient rate in spite of much amount of the propylene polymerization unit occupying in the propylene-ethylene random copolymer. Due to such a characteristic, the resulting insulated electric wire achieves excellent anti-scrape property and rubber-like physical property and, at the same time, it is able to achieve an excellent deformation by heating as compared with the insulated electric wire using the conventional friction resistant resin composition wherein soft polyolefin mainly comprising ethylene polymerization unit is used.

In addition, as a result of the use of the above-mentioned microblend, mechanical properties such as tensile strength is improved and the insulated electric wire of the present invention also achieves enhancement of strength by that.

When the component eluted at low temperature of the above-mentioned microblend is less than 10% by weight, flexibility lowers because abundant crystalline components are contained in the resin composition and it is difficult to prepare a resin composition wherein a modulus of elasticity in flexure is 2,000 MPa or less resulting in lowering of flexibility and lowering of resistance against whitening in the insulated electric wire where the above is used as an insulating material.

When the component eluted at low temperature of the above-mentioned microblend is more than 90% by weight, deformation by heating of the resulting insulated electric wire lowers and, at the same time, because of high adhesion of the resin, there is a tendency that blocking among the insulated electric wire is apt to happen.

When the eluted components in the microblend of the present invention fractionated by a thermal desorption fractional method have the following gradient distribution of the eluted components, further excellent flexibility and resistance against deformation by heating are able to be given to the insulated electric wire and that is preferred.

Thus, it is particularly preferred that, in the microblend, rate of the component (a) which is the component eluted at −40° C. or higher but lower than 20° C. is 20 to 80% by weight, rate of the component (b) which is the component eluted at 20° C. or higher but lower than 100° C. is 10 to 70% by weight and rate of the component (c) which is the component eluted at 100° C. or higher is 1 to 40% by weight in the total eluted components fractionated by a temperature-rising elution fractionation method using an o-dichlorobenzene solvent (sum of the component (a), component (b) and component (c) is 100% by weight).

Thus, the above-mentioned component (a) is a component which contributes in expression of flexibility of the resin composition. When the rate of the component (a) is less than 20% by weight, flexibility of the resin composition is apt to be deteriorated and there are introduced lowering of bending property of the resulting insulated electric wire and lowering of resistance against whitening by bending caused by addition of the filler which will be mentioned later.

On the other hand, when the rate of the component (a) is more than 80% by weight, heat resistance of the resin composition lowers and resistance against deformation by heating of the resulting insulated electric wire lowers.

In order to prepare an insulated electric wire having better bending property and resistance against deformation by heating, it is preferred that the rate of the above-mentioned component (a) is 30 to 70% by weight. Bending property of the insulated electric wire is a property which is necessary in view of break processing ability of the insulated electric wire and converting property and assembling property of the a wire bundle. It is also a necessary property that, when overcurrent flows in the insulating wire, the insulating material is not melted by heating and the conductor is not exposed.

On the other hand, the component (b) is a component which expresses the miscibility between the component (a) and the component (c) and, as a result, a balance between flexibility and heat resistance of the resulting resin composition becomes good and that is reflected on the characteristic of the resulting insulated electric wire. Like in the property concerning the above component (a), there is a tendency that a good flexibility of the resin composition lowers when the rate of the component (b) is less than 10% by weight while, when it is more than 70% by weight, heat resistance of the resin composition it apt to be insufficient. In order to keep a balance between more appropriate flexibility and resistance against deformation by heating of the resulting insulated electric wire, the rate of the above-mentioned component (b) is preferably 15 to 50% by weight.

The component (c) is a component which is necessary to achieve an excellent heat resistance which is a characteristic of polypropylene and to give an excellent resistance against deformation by heating to the insulated electric wire. Thus, when the component (c) is less than 1% by weight, heat resistance of the resin composition becomes insufficient and the resistance against deformation by heating of the insulated electric wire using it tends to lower. When the component (c) is more than 40% by weight, flexibility of the resin composition is deteriorated and bending property and resistance against whitening by bending of the insulated electric wire using it lower. In order to achieve better heat resistance, the above-mentioned component (c) is preferably within a range of 5 to 30% by weight.

In the microblend used in the present invention, polypropylene corresponds to the component (c) eluted in the above-mentioned temperature-rising elution fractionation method (hereinafter, may be referred to as "TREF"). Examples of the polypropylene as such are a homopolymer of propylene, a random copolymer of propylene with α-olefin containing not more than 10 mol % of polymerization unit of α-olefin other than propylene and a microblend of polypropylene with a random copolymer of propylene with α-olefin.

Each of them may be used solely or two or more thereof may be mixed and used.

Examples of the α-olefin as such are ethylene, butene-1, 1-pentene, 1-hexene, 1-octene, 3-methyl-1-butene and 4-methyl-1-pentene.

In the microblend of the present invention, the random copolymer of propylene with ethylene almost corresponds to the component (a) and the component (b) which are eluted in the above TREF. In the components of such a random copolymer of propylene with ethylene, it is important for achieving the object of the present invention that the rate of the ethylene polymerization unit is 15 to 50 mol % and that of the propylene polymerization unit is 85 to 50 mol %. More preferably, the rate of the propylene polymerization unit is 85 to 60 mol % and that of the ethylene polymerization unit is 15 to 40 mol %.

When the rate of the above-mentioned propylene polymerization unit is more than 85 mol % and that of the ethylene polymerization unit is less than 15 mol %, flexibility of the resulting resin composition is deteriorated and bending property of the insulated electric wire prepared by using it lowers. On the other hand, when the rate of the propylene polymerization unit is less than 50 mol % and that of the ethylene polymerization unit is more than 50 mol %, heat resistance of the resulting resin composition is deteriorated and resistance against deformation by heating of the resulting insulated electric wire using it lowers.

In the present invention, the above-mentioned microblend may contain other α-olefin polymerization unit than the above-mentioned propylene polymerization unit and ethylene polymerization unit within such an extent that the characteristic thereof is not significantly changed.

To be more specific, an α-olefin polymerization unit such as 1-butene may be contained in an amount of not more than 10 mol %.

In the present invention, the above-mentioned microblend may, for example, be manufactured by a method mentioned in JP-A-05-320468. The gazette of JP-A-05-320468 is unified as a description of the present specification. In the present invention, "microblend" is understood to be such a thing that where polypropylene and a random copolymer of propylene with ethylene are mixed in a molecular level or in a similar level thereto as being manufactured in the above-mentioned method. The above-mentioned microblend may be customarily called a propylene-ethylene block copolymer.

In the present invention, there is no particular limitation for the weight-average molecular weight of the microblend prepared by the above-mentioned manufacturing method. The weight-average molecular weight by gel permeation chromatography (converted by polystyrene) is preferably 70,000 to 7,000,0000, more preferably 200,000 to 3,000,000 and, particularly preferably, 300,000 to 2,000,000.

It is also preferred that the microblend is used after adjusting its melt flow rate (MFR) to around 0.3 to 150 g/10 minutes. Incidentally, in the present invention, the melt flow rate is a value measured in accordance with JIS K 7210.

In the present invention, it is important to use a modified microblend where the microblend is bonded to an organic acid group for the purpose of improving the abrasion resistance of the resin composition lowered by addition of an inorganic filler without disturbing the effect by addition of the inorganic filler, improving the scrape property of the insulated electric wire using the above as an insulating material and giving a resistance against whitening by bending.

There is no particular limitation for the type of the above-mentioned organic acid group. Usually, there are listed organic acid groups resulting from unsaturated organic acids or derivatives thereof such as an acid anhydride. Thus, the examples are a monobasic acid, a dibasic acid and an acid anhydride such as acrylic acid, methacrylic acid, maleic acid, fumaric acid, itaconic acid, citraconic acid, maleic acid anhydride, citraconic acid anhydride and itaconic acid anhydride. Other examples are metal salt, imide, amide, ester, etc. of the above-mentioned unsaturated organic acids.

With regard to a method for preparing a modified microblend by bonding an organic acid group to a microblend, publicly known method may be used without any limitation. Its examples are a method where microblend is contacted to unsaturated organic acid or derivative thereof such as an acid anhydride in an inert organic solvent, a method where radioactive ray such as electronic ray, X-ray, α-ray or γ-ray is irradiated and a method where a reaction initiator represented by an organic peracid is added to microblend and unsaturated organic acid or derivative thereof such as acid anhydride followed by subjecting to melting and kneading and the above method of melting and kneading is most preferred in an industrial view.

Examples of the organic peracid used in the method for the manufacture of the above-mentioned modified microblend are dicumyl peroxide, 2,5-dimethyl-2,5-di-(tert-butylperoxy)-hexane, 2,5-dimethyl-2,5-(tert-butylperoxy) hexy-3-di-tert-butyl peroxide, cumene hydroperoxide, tert-butyl hydroperoxide, benzoyl peroxide, lauyl peroxide, 1,3-bis(tert-butylperoxyisobutyl)benzene and α,α-bis(tert-butylperoxydiisopropyl)benzene.

With regard to a method for the preparation of the above-mentioned modified microblend, it is also possible to carry out a method where vinyl acetate, acrylate, unsaturated carboxylic acid, etc. are copolymerized during the copolymerization of the microblend.

It is preferred that the modified microblend is used after adjusting its melt flow rate (MFR) to around 0.3 to 250 g/10 minutes.

In the present invention, it is necessary to use the above-mentioned modified microblend by mixing with the above-mentioned non-modified microblend in order to homogeneously disperse the ion cross-linking filler which will be mentioned later with the mixture so as to achieve excellent bending property and resistance against whitening by bending.

In that case, it is important that concentration of the organic acid group in the mixture is in a rate of 0.01 to 1.0 mmol per 1 g of the total microblend wherein the microblends constituting the said microblend and the said modified microblend are combined.

Thus, when the concentration of the bonded organic acid group to the total microblend is less than 0.01 mmol/g, abrasion resistance of the resin composition lowers and a scrape property lowers. When the concentration of the bonded organic acid group is more than 1 mmol/g, improvement of the effect is not achieved whereby it is not preferred in view of economy and, in addition, there are some cases where resistance against dielectric breakdown of the resulting insulated electric wire lowers.

In the above-mentioned mixture, concentration of the organic acid group bonded to the total microblend is preferably 0.05 to 0.7 mmol/g or, more preferably, 0.1 to 0.3 mmol/g.

In the present invention, a mixture of the above-mentioned microblend and the modified microblend prepared by bonding the organic acid group to the said microblend is manufactured in such a manner that a master batch where organic acid group is bonded in much amount exceeding the range of 0.01 to 1 mmol to 1 g of the microblend is prepared, the resulting master batch is mixed with the microblend and the mixture is adjusted to give the above-mentioned concentration of the organic acid group.

The mixture of the microblend and the modified microblend is preferably a mixture of 10 to 90% by weight of the microblend and 90 to 10% by weight of the modified microblend.

In the present invention, it is preferred in improving the heat resistance of the resin composition and to improve the resistance against deformation by heating of the resulting insulated electric wire using the same that, within the range of satisfying the above-mentioned modulus of elasticity in flexure of the resulting resin composition, propylene is separately added as a component (B).

Polypropylene is used preferably in an amount of not more than 700 parts by weight, more preferably in an amount of 600 to 10 parts by weight or, particularly preferably, in an amount of 500 to 40 parts by weight based on 100 parts of the total microblend of the above-mentioned mixture.

Thus, when the rate of the above-mentioned polypropylene is more than 700 parts by weight, flexibility of the resin composition is apt to be deteriorated and bending property and resistance against whitening by bending of the resulting insulated electric wire lower. When the above-mentioned polypropylene is compounded in a rate of 10 parts by weight or more, it is possible to further enhance the heat resistance of the resin composition and to further improve the resistance against deformation by heating of the insulated electric wire.

With regard to the above-mentioned polypropylene, it is possible to use a propylene homopolymer, a copolymer of propylene with α-olefin containing not more than 15 mol % of polymerization unit of α-olefin which is other than propylene and a microblend of polypropylene and a random copolymer of propylene with α-olefin. Each of them may be used solely or two or more thereof may be mixed and used.

Examples of other α-olefin as such are ethylene, butane-1, 1-pentene, 1-hexene, 1-octene, 3-methyl-1-butene and 4-methyl-1-pentene.

With regard to the melt flow rate (MFR) of the above-mentioned polypropylene, that of around 0.3 to 150 g/10 minutes is advantageous.

With regard to melt flow rate ratio among the above-mentioned modified microblend, microblend and polypropylene, degree of crystallinity, stereoregularity, viscosity, dissolving (or non-dissolving) matters in a solvent such as heptane, hexane, p-xylene, etc., melting point, heat of fusion and various other parameters, it is possible to apply them without any limitation within such an extent that properties in the present invention are not deteriorated.

In the present invention, an ion cross-linking filler is compounded for the purpose of giving abrasion resistance, heat resistance and rubber-like nature to the resin composition containing the above-mentioned components (A) and (B) used as an insulating material and of achieving anti-scrape property and resistance to deformation by heating of the resulting insulated electric wire with other characteristics in a well-balanced manner.

Thus, the ion cross-linking agent is that which acts on the organic acid group contained in the above-mentioned microblend in the fusion/kneading and forms an ion cross-linked structure. Although the resin composition is a cross-linked substance, it achieves a very good recycling property.

In the present invention, the filler which acts as an ion cross-linking agent can be used by appropriately being selected from known fillers.

With regard to the ion cross-linking filler used in the present invention, the known ones which are able to cross-link with the above-mentioned organic acid group may be used without any limitation. Examples are magnesium oxysulfate, magnesium hydroxide, aluminum hydroxide, aluminum borate, calcium silicate, calcium carbonate and hydrotalcite. Among them, hydroxides of multivalent metal such as magnesium hydroxide and aluminum hydroxide are particularly advantageous. With regard to the above-mentioned ion cross-linking fillers, known ones such as natural and synthetic substances may be used without limitation.

With regard to the shape of the ion cross-linking filler, fibrous and/or plate-like one(s) are/is exemplified. In the case of fibrous one, that where its average fibrous diameter is preferably 0.1 to 2 μm or, more preferably, 0.5 to 1.0 μm and its aspect ratio is preferably 3 to 1,000 or, more preferably, 15 to 80 is advantageous. In the case of a plate-like one, that where its average particle size by a particle size distribution measurement using a laser diffraction scattering method (refer to "Biryushi Kogaku Taikei (Microparticle Technology)", Volume 1, Fundamental Technique, published by K. K. Fuji Techno System, First Edition, Oct. 31, 2001) is 0.5 to 10 μm or, preferably, 1 to 6 μm and its aspect ratio is 3 to 200 or, preferably, 15 to 80 is advantageously used. The above-mentioned fibrous and plate-like ion cross-linking fillers may be also used together in any ratio.

Surface of the above-mentioned ion cross-linking agent may be treated with a known surface-treating agent. With regard to the surface-treating agent, fatty acid such as oleic acid and stearic acid, fatty acid metal salt such as magnesium stearate, aluminum stearate, zinc stearate, sodium stearate or potassium stearate, compound of a silicon type, a silane type and a phosphorus type and various coupling agents of a phosphate type, a phosphate amine type, etc. are listed for improving the dispersing property for example. Surface treatment with fatty acid such as oleic acid and stearic acid, fatty acid metal salt such as magnesium stearate and sodium stearate and a phosphate type is particularly preferred in terms of improvement of dispersing property, flame retarding property, moisture resistance, waterproofness, resistance to hot water, resistance to saline solution, etc. Here, two or more of the above-mentioned surface-treating agents may be used together.

In the present invention, the above-mentioned ion cross-linking filler acts on the resin composition as a cross-linking agent, also acts as a flame retarding agent when added in large quantities and further acts as an acid trapping agent which catches free acid after the cross-linking. Particularly, the action of the above-mentioned hydroxide as a flame retardant acts synergistically with the modified microblend whereby a very good flame retarding property is able to be achieved.

Accordingly, the adding amount of such an ion cross-linking filler is 5 to 200 parts by weight or, preferably, 10 to 180 parts by weight based on 100 parts by weight in total of all resin components mainly comprising the above-mentioned components (A) and (B).

When the compounding amount of the ion cross-linking agent to 100 parts of the total resin components is less than 5 parts by weight, a sufficient ion cross-linking is not achieved in the resin composition while, when it is more than 200 parts by weight, appearance of the resulting insulated electric wire lowers.

Presence and polymerization of the ion cross-linking formed by the above-mentioned ion cross-linking filler are able to be confirmed by checking the infrared spectrum for the gel area. Thus, absorption bands due to the bond of carboxyl group or acid anhydride group to multivalent metal ion are formed in 1560 to 1580 $cm^{-1}$ whereby the fact that the above-mentioned cross-linking reaction took place can be confirmed.

In the resin composition having the above-mentioned cross-linking structure, the rate of the gel part showing the rate of the cross-linked part is preferably within a range of 10 to 80% by weight or, more preferably, 20 to 60% by weight.

The above-mentioned rate of the gel part can be adjusted by controlling the concentration of the organic acid group, compounding rate thereof, compounding amount of the ion cross-linking agent, etc. in the above-mentioned modified microblend.

Because of the presence of the special gel part derived from the modified microblend as mentioned above, the resin composition achieves a very significant effect in view of heat resistance as compared with the conventional elastomer of a polyolefin type and, as mentioned above, that is reflected on improvement of anti-scrape property and resistance against deformation by heating of the resulting insulated electric wire and, further, on improvement of resistance to whitening and productivity.

In the present invention, although the action mechanism why the above-mentioned effect is achieved by the presence of the above-mentioned gel part is not clear, the gel part contains an ion cross-linked product of the modified microblend having a specific crystallinity distribution and its property is characterized in showing an appropriate swelling property to a solvent even when an average cross-linking density is made relatively high whereby a very good dispersing property in the matrix resin is presumed to be resulted.

In the present invention, some cross-linked products are formed in the above-mentioned gel of the resin composition by the reaction of connecting the organic acid group and the gel part in the present invention may partly contain such a cross-linked product together with the ion cross-linked product.

In the present invention, the gel part in the resin composition means the rate of insoluble matter after conducting a Soxhlet extraction for 6 hours using p-xylene for the resin composition sample which is subjected to a strand-cutting of a particle size of 2.5 to 3.5 mm.

The gel part is mentioned to the polymer composition and, when the composition contains an insoluble component other than the cross-linked polymer such as an inorganic substance, it is calculated in a rate of the gel part excluding such a component.

In the present invention, there is no particular limitation for the fluidity of the resin composition upon melting and the melt flow rate (MFR) is preferably within a range of not more than 100 g/10 minutes and the range of not more than 20 g/10 minutes is common.

The resin composition used in the present invention may be compounded with various kinds of additives within an extent of satisfying the constituent feature of the present invention.

For example, polyolefin resin which is other than the above-mentioned microblend, modified microblend and polypropylene may be compounded. For example, a polyolefin resin such as a random copolymer of propylene with ethylene, microblend of polypropylene and a random copolymer of propylene with ethylene, high-density polyethylene, medium-density polyethylene, low-density polyethylene, linear polyethylene comprising a copolymer of ethylene with α-olefin of 4 to 10 carbons, a copolymer of ethylene with propylene (EPDM), a copolymer of ethylene with butane-1, a copolymer of propylene with butane-1, poly(1-butene), poly(1-pentene), poly(4-methylpentene-1), polybutadiene and polyisopropylene may be compounded.

With regard to the resin which is other than the above-mentioned ones, it is possible to compound, for example, hydrocarbon of a petroleum resin type such as a copolymer of ethylene with vinyl acetate, ethylene methacrylate, polychloroprene, halogenated polyethylene, halogenated polypropylene, fluorine resin, acrylonitrile-butadiene rubber, polystyrene, polybutadiene terephthalate, polycarbonate, polyvinyl chloride, fluorine rubber, polyethylene terephthalate, polyamide, a copolymer of acrylonitrile with butadiene and styrene, petroleum resin, hydrogenated petroleum resin, terpene resin and hydrogenated terpene resin and aromatic vinyl rubber such as a styrene-isoprene-styrene block copolymer, a styrene-isoprene-styrene block copolymer, a styrene-ethylene-styrene-styrene block copolymer, a styrene-propylene-butylene-styrene block copolymer and hydrogenated products of the above copolymers.

The above-mentioned resin may have the above-mentioned organic acid group in a bonded form.

It is advantageous that such a resin as an additive is compounded within a range of preferably not more than 100 parts by weight, within a range of more preferably not more than 50 parts by weight and, still more preferably, within a range of not more than 40 parts by weight to 100 parts by weight of a mixture of the above-mentioned components (A) and (B).

In addition to the above-mentioned ion cross-linking filler component, the resin composition constituting the insulating material in the present invention may be compounded, if necessary, with a known fibrous filler such as potassium titanate fiber, glass fiber, carbon fiber, metal fiber, asbestos, wollastonite, gypsum fiber, mineral fiber and organic fiber (polyamide fiber, polyester fiber, etc.), a known plate-like filler such as talc, mica, clay, glass flake, graphite, aluminum flake, kaolin clay, iron oxide, sericite, molybdenum disulfide, barium sulfate and vermiculite or a known spherical filler such as zeolite, diatom, calcium carbonate, silica, silicate and glass beads. Here, two or more of the above-mentioned filler may be used together.

Compounding amount of the above-mentioned filler to 100 parts by weight of the total resin component is preferably 0.1 to 80 part(s) by weight.

The resin composition used in the present invention may be further compounded with other additive so far as the effect of the invention is not deteriorated. To be more specific, they are a heat stabilizer of a hindered amine type, etc. a weather resistant agent of a hindered amine type, etc.; an ultraviolet absorber of a benzophenone type, a benzotriazole type, a benzoate type, etc.; an antistatic agent of a nonionic type, a cationic type, an anionic type, etc.; a dispersing agent of a bisamide type, a wax type, etc; a lubricant of an amide type, a wax type, an organometallic type, an ester type, etc.; a decomposing agent of an oxide type, etc.; a metal inactivator of a melamine type, a hydrazine type, an amine type, etc.; a flame retardant of a bromine-containing organic type, a phosphoric acid type, an antimony trioxide type, a red phosphorus type, a silicon type, a silica type, a melamine type, a glass type, an aqueous inorganic substance type, etc.; an organic pigment; an inorganic pigment; a clearing agent or a nucleus-forming agent of a sorbitol type, an aromatic metal phosphate type, an organic acid metal type, etc.; an anti-clouding agent; an anti-blocking agent; a foaming agent; an organic filler; an inorganic antibacterial of a metal ion type, etc.; an organic antibacterial; etc. although they are not limitative. Here, two or more of the above and other additives may be used together.

In the resin composition used in the present invention, a known antioxidant of a phenol type may, if necessary, be used without any limitation. To be more specific, they are 2,5-di-tert-butyl-4-hydroxyphenol, 2,6-di-tert-butyl-p-cresol, 2,6-diphenyl-4-octadecyloxyphenol, stearyl (3,5-di-tert-butyl-4-hydroxyphenyl) propionate, distearyl (3,5-di-tert-butyl-4-hydroxybenzyl) phosphonate, thiodiethylene glycol bis[(3,5-di-tert-butyl-4-hydroxyphenyl) propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), 2,2'-methylenebis(4-ethyl-6-tert-butylphenol), bis[3,3'-bis(4-hydroxy-3-tert-butylphenyl) butyric acid] glylcol ester, 4,4'-butylidenebis(6-tert-butyl-m-cresol), 2,2'-ethylidenebis(4,6-di-tert-butylphenol), 2,2'-ethylidenebis(4-tert-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl) isocyanate, 1,3,5-tris(3,5-di-tert-butyl-4-hydroxybenzyl) isocyanate, 1,3,5-tris(3,5-di-tert-butyl-4-hydroxybenzyl)-2,4,6-trimethylbenzene, 1,3,5-tris[(3,5-di-tert-butylo-4-hydroxyphenyl)propionylox yethyl] isocyanate, tetrakis[methylene(3,5-di-tert-butyl-4-hydroxyphenyl) propionate] methane, 2-tert-butyl-4-methyl-6-(2-acryloyloxy-3-tert-butyl-5-methylbenzyl)phenol, 3,9-bis(1,1-dimethyl-2-hydroxyethyl)-2,4,8,10-tetraoxaspiro[5,5]undecane-bis[β-(3-tert-butyl-4-hydroxy-5-methylphenyl) propionate], triethylene glycol bis[β-(3-tert-butyl-4-hydroxy-5-methylphenyl) propionate], etc.

An antioxidant of a phenol type as such is 0.001 to 1 part by weight or, preferably, 0.01 to 0.8 part by weight based on 100 parts by weight of the total resin composition.

With regard to the above-mentioned antioxidant of a phenol type, only one may be used solely or two or more may be used jointly.

When the adding amount of the above-mentioned antioxidant of a phenol type is less than 0.001 part by weight, deterioration of the resin is significant whereby the resin becomes yellow and that is not preferred. When it is more than 1 part by weight, that is not preferred in view of economy.

Furthermore, in the resin composition used in the present invention, a known antioxidant of an organic phosphorus type may, if necessary, be used without any limitation. To be more specific, they are trisnonylphenyl phosphite, tris(2,4-di-tert-butylphenyl) phosphite, di(tridecyl) pentaerythritol diphosphite, bis(2,4-di-tert-butylphenyl) pentaerythritol diphosphite, bis(2,6-di-tert-butyl-4-methylphenyl) pentaerythritol diphosphite, tetra(tridecyl) isopropylidenediphenol diphosphite, tetra(tridecyl)-4,4-n-butylidenebis(2-tert-butyl-5-methylphenol) diphosphite, hexa tridecyl)-1,1',3-tris(3-tert-butyl-4-hydroxy-5-methylphenyl)butane triphosphite, hexa(tridecyl)-1,1',3-tris(3-tert-butyl-4-hydroxy-5-methylphenyl)butane triphosphite, 2,2'-methylenebis(3,5-di-tert-butylphenyl)octyl phosphite, 2,2'-methylenebis(4,6-di-tert-butylphenyl)octadecyl phosphate, 2,2'-methylenebis(4,6-di-tert-butylphenyl) fluorophosphite, tetrakis(2,4-di-tert-butylphenyl) biphenylene diphosphonite, etc.

It is appropriate that an antioxidant of an organophosphorus type as such is compounded in an amount of 0.001 to 1 part by weight or, preferably, 0.01 to 0.8 part by weight to 100 parts by weight of the total resin composition.

With regard to the above-mentioned antioxidant of an organophosphorus type, only one may be used solely or two or more may be used jointly.

When the adding amount as such is less than 0.001 part by weight, deterioration of the resin is significant whereby the resin becomes yellow and that is not preferred. When it is more than 1 part by weight, that is not preferred in view of economy.

In the resin composition used in the present invention, a known antioxidant of a thioether type may, if necessary, be used without any limitation. To be more specific, they are dialkylthio dipropionate such as dilauryl, dimyristyl and distearyl ester of thiodipropionic acid and polyol-β-alkylmercaptopropionate such as pentaerythritol tetra(β-dodecylmercaptopropionate).

It is appropriate that an antioxidant of a thioether type as such is compounded in an amount of 0.001 to 1 part by weight or, preferably, 0.01 to 0.8 part by weight to 100 parts by weight of the total resin composition.

With regard to the above-mentioned antioxidant of a thioether type, only one may be used solely or two or more may be used jointly.

When the adding amount as such is less than 0.001 part by weight, deterioration of the resin is significant whereby the resin becomes yellow and that is not preferred. When it is more than 1 part by weight, that is not preferred in view of economy.

In the joint use of the above-mentioned antioxidant of a phenol type, antioxidant of an organophosphorus type and antioxidant of a thioether type, it is still possible that only one member from each of them may be used or two or more may be used so far as their total adding amount to 100 parts by weight of the total resin component is 0.001 to 2 part(s) by weight or, preferably, 0.01 to 1 part by weight.

In compounding each of the above-mentioned components, common methods which have been done in mixing the resin can be adopted in the present invention without any limitation. For example, a method where other resin, additive, filler, etc. are added to the above-mentioned resin in powder or in pellets, mixed using a tumbler, a Henschel mixer, a Bumbury mixer, a ribbon feeder, a super-mixer, etc. and melted and kneaded at the kneading temperature of 150 to 350° C. or, preferably, 190 to 280° C. using a monoaxial or polyaxial extruder (preferably, a melting and kneading apparatus where deaeration is possible), roll, kneader, Bumbury, etc. to give pellets is appropriate.

There is no particular limitation for the order of addition of the above-mentioned components and each of the component may be mixed in the order which is different from that in the above method. It is also possible that a master batch where other additive and filler components are concentrated in high concentrations and compounded is prepared and is used by mixing.

When the above-mentioned resin composition is used as an insulating material, the insulated electric wire of the present invention is excellent in an extruding property of the resin in the manufacture of wire and is good in its productivity. Thus, in the production of electric wire by a high-speed extrusion molding, a resin characteristic that melt fracture phenomenon is not available and swell ratio is small is necessary for its production without affecting on appearance and property. An insulated electric wire of a PE type having poor appearance characteristic in the high-speed production is poor in the appearance property by a melt fracture phenomenon. In the production of an insulated electric wire of a PVC type, a melt fracture phenomenon is also generated by a more high-speed molding and there is a limitation in the production speed.

On the contrary, when the resin composition of the present invention is used, there is no poor appearance due to a melt fracture phenomenon in a production speed limit or even more for not only insulated electric wire of a PE type but also insulated electric wire of a PVC type, a stable production is possible and improvement in the productivity can be achieved whereby that is excellent in terms of economy as well.

In addition to the above-mentioned characteristics, the insulated electric wire of the present invention is excellent in terms of environmental preservation such as recycling property and prevention of toxic gas upon burning because of the resin composition constituting the wire.

Figure 2:
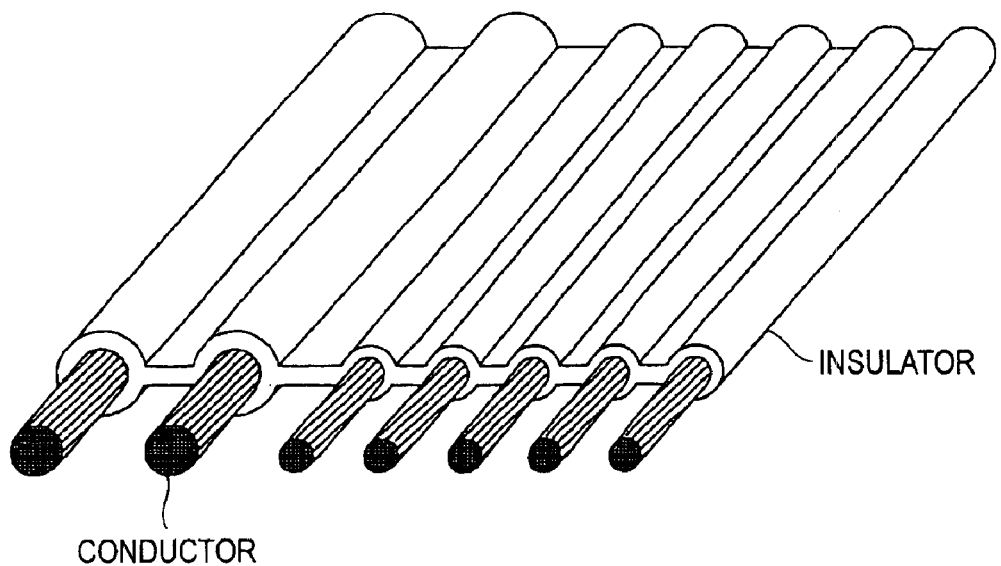
FIG. 2 is an oblique view showing another embodiment (a flat wire) of the insulated electric wire of the present invention.
Figure 3:
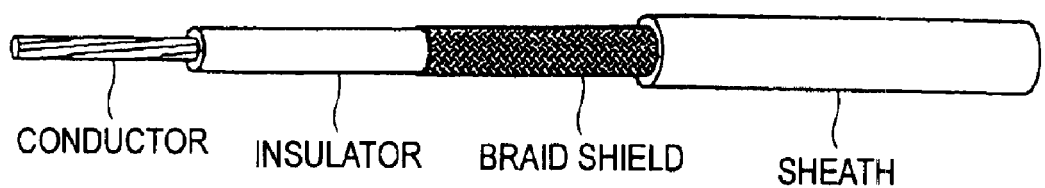
FIG. 3 is an oblique view showing still another embodiment (a shielded wire) of the insulated electric wire of the present invention.
Figure 4:
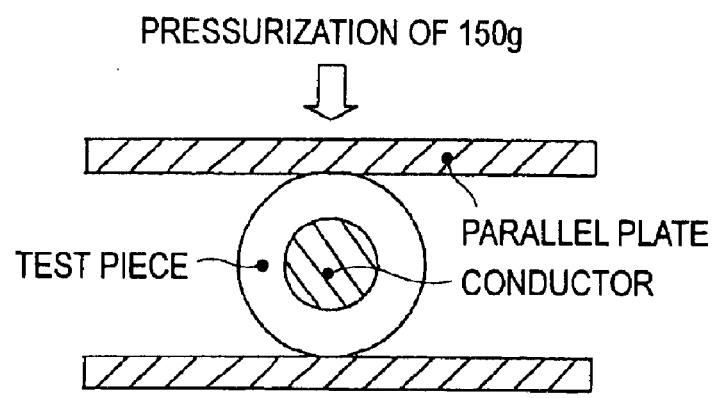
FIG. 4 shows an outline of the measuring apparatus used for the evaluation of (d) resistance against deformation by heating in Example.

With regard to embodiments of constituting the insulated electric wire by coating the conductor with an insulating material substantially comprising a resin composition in the present invention, known embodiment such as a single wire shown in FIG. 1, a flat wire shown in FIG. 2 and a shielded wire shown in FIG. 3 may be adopted without particular limitation.

Further, the insulated electric wire of the present invention is able to be used in every wire without limitation for harness wire for automobiles, wire for household electrical appliances, wire for electric power, wire for instruments, wire for information communication, wire for optical fiber, electric cars, ships, airplanes, etc.

In the above-mentioned embodiments, thickness of the coated layer of around 0.1 to 5 mm is usually adopted.

In the present invention, known methods may be adopted without particular limitation as a method for the manufacture of the above-mentioned insulated electric wire. For example, with regard to an extruder, there is used a monoaxial extruder where a cylinder diameter ø is 20 to 90 mm and L/D is 10 to 40 equipped with screw, crosshead, breaker plate, distributor, nipple and dice.

A resin composition is poured into a monoaxial extruder which is set at a temperature where the resin composition is well melted. The resin composition is melted and kneaded by a screw and a certain amount thereof is supplied to a crosshead via a breaker plate. The melted resin composition is flown onto a circumference of a nipple by a distributor. A method where the melted resin composition flown thereon is extruded by a dice in a coated state on a circumference of the core wire to manufacture an insulated electric wire is common.

In that case, the resin composition used has a swell ratio of near 1 as compared with PVC or known soft polyolefin and, therefore, it has also a characteristic that a good molding property is achieved in the above-mentioned extrusion molding.

EXAMPLES

As hereunder, the present invention will be illustrated by way of Examples and Comparative Examples in order to illustrate more specifically, however the present invention is not limited thereto.

Incidentally, various measurements and evaluations in Examples and Comparative Examples are carried out according to the following methods.

A method for processing the electric wire used in the present evaluation is that an electric wire extruder (ø: 60; L/D=24.5; FFscrew) is used and extrusion speed is 500 m/minute, extrusion temperature is 230° C., area of conductor is 0.5387, constitution of the original wire is 0.19 mm×19 twisted wires and final outer diameter is 1.6 mm.

(1) Evaluations of Insulated Electric Wire (a) Resistance to Whitening

Electric wire was bended to an extent of 180° and the result whether whitening was noted at the bent part was confirmed by naked eye. When whitening (caused by generation of microcracks) was noted, it was evaluated to be disqualified (x) and when no whitening was noted, it was evaluated to be qualified (o).

(b) Abrasion Resistance

This was conducted in accordance with item 14 of ISO 6722-1 where a piano wire of 0.45 mm diameter was used with a load of 5N and the reciprocation times until the piano wire touched the conductor due to abrasion of the insulating material were counted. When the reciprocation times of the piano wire at that time were less than 150, it was evaluated to be disqualified (x) and, when they were 150 or more, it was evaluated to be qualified (o).

(c) Productivity Appearance of Surface of Electric Wire upon Extrusion Molding of the Wire)

Appearance of the electric wire prepared by a wire extruder (ø: 60; L/D=24.5; FF screw) was confirmed by naked eye and feel upon touching. When the rough skin was noted, it was evaluated to be disqualified (x) and, when gloss was noted, it was evaluated to be (O).

(d) Resistance against Deformation by Heating

This was conducted in accordance with JISC 305. A sample of about 600 mm length was used and the test piece was heated for 30 minutes in a tester which was previously heated at 165° C., placed between parallel plates of the measuring device, applied with a weight of 150 g and heated at the same temperature for 30 minutes more. After heating, its resistance to voltage (1 kV×1 minute) of this test piece was evaluated and the result whether dielectric breakdown was noted was confirmed. When dielectric breakdown was noted, it was evaluated to be disqualified (x) and, when no dielectric breakdown was noted, it was evaluated to be qualified (o).

(2) Physical Properties, etc. of the Resin Composition (e) Weight-Average Molecular Weight of a Block Copolymer of Propylene with Ethylene With regard to the apparatus used and the measuring conditions, type GPC-150 C manufactured by Waters was used and temperature of 135° C., solvent of o-dichlorobenzene, column of TSK GMH6-HT manufactured by Tosoh and gel size of 10 to 15 µm were used, respectively. A calibration curve for converting a polypropylene elution curve to a molecular weight distribution curve was determined by the following method. Thus, mono-dispersed polystyrenes having the molecular weights were 950, 2900, 10,000, 50,000, 498,000, 2,700,000, 6,750,000 and 20,600,000 were used as standard samples to prepare a calibration curve for polystyrene and it was converted to a calibration curve for polypropylene by a method mentioned in pages 64 to 66 of the document which was "Gel Permeation Chromatography" (published by Maruzen on May 20, 1976). Incidentally, with regard to the constant used for the conversion, that mentioned in Table 5 of the document was used.

(f) Measurement of Organic Acid Group in a Block Copolymer Resin of Modified Propylene with Ethylene A working curve was prepared for the measurement of amount of graft organic acid in a block copolymer of modified propylene with ethylene. Styrene and an organic acid were placed in benzene, azobisisobutyronitrile was added thereto, the resulting copolymer of styrene with the organic acid was mixed with homopropylene and made into a sheet and a working curve was determined from absorbance of the organic acid and thickness of the sheet using an infrared spectrophotometer. A block copolymer of modified propylene with ethylene was heated in p-xylene to completely dissolve, re-precipitated in a large amount of methanol and dried to give a sheet, absorbance of the organic acid was measured by an infrared spectrophotometer and, using the working curve, the organic acid group in the block copolymer resin of modified propylene with ethylene was measured.

(g) Temperature-Rising Elution Fractionation Method

It was conducted under the following measuring condition using type SSC-7300 manufactured by K. K. Senshu Kagakusha.

Solvent: o-dichlorobenzene or o-dibromobenzene

Flow rate: 2.5 ml/minute

Temperature-rising speed: 4.0° C./hour

Sample concentration: 0.7 wt %

Injected amount of the sample: 100 ml

Detector: Infrared detector; wavelength: 3.14 µm

Column: ø 30 mm×300 mm

Filler: Chromosorb P, 30 to 60 mesh

Cooling speed of the column: 2.0° C./hour (h) Modulus of Elasticity in Flexure

Conducted in accordance with JIS K 7203.

(i) Rate of the Gel Part

Strand cut sample (5 g) having a particle size of 2.5 to 3.5 mm was placed in a wire net bag made of stainless steel and subjected to a Soxhlet extraction for 6 hours at the boiling temperature of p-xylene. The extracted sample was dried in a vacuum drier at 70° C. for 18 hours and the residue of the extract (gel fraction) was measured. Incidentally, the gel part was for the polymer composition and, when the composition contained an insoluble component other than the cross-linked substance such as inorganic substance, the insoluble component was removed by burning or the like and the rate of the gel part was calculated.

Sample 1:

(Preliminary Polymerization)

An autoclave reactor made of stainless steel of inner volume of 1 liter equipped with a stirrer was well substituted with nitrogen gas and then 400 ml of hexane were charged therein. Temperature in the reactor was kept at 20° C., 4.2 mmol of dicyclopentyl dimethoxysilane, 21.5 mmol of ethyl iodide, 21.5 mmol of triethyl aluminum and 21.5 mmol of titanium trichloride (manufactured by Marubeni Solvay Kagaku) were added and then propylene was continuously introduced into the reactor for 30 minutes so as to make it 3 g per 1 g of titanium trichloride.

Temperature during that period was kept at 20° C. After stopping the supply of propylene, inner area of the reactor was well substituted with nitrogen gas and the resulting titanium-containing polypropylene was washed with pure hexane for four times. As a result of analysis, 2.7 g of propylene were polymerized per gram of titanium chloride.

(Main Polymerization)

To a 2 m$^3$ autoclave substituted with nitrogen were added 1 m$^3$ of liquid propylene, 2.4 mol of triethyl aluminum and 1.2 mol of dicyclopentyl methoxysilane, then hydrogen was added so as to make its concentration in the gas phase 1.0 mol % and the inner temperature of the autoclave was raised to 55° C.

After that, ethylene was added thereto so as to make its concentration in the gas phase 1.5 mol %, then titanium-containing polypropylene prepared in the preliminary polymerization was added in an amount of 0.3 mol as titanium trichloride and copolymerization of propylene with ethylene was carried out at 55° C. for 20 minutes (step 1).

After that, ethylene gas was supplied so as to make its concentration in the gas phase 10 mol % and polymerization was carried out for 120 minutes (step 2). Unreacted monomer was purged to give microblend.

The microblend prepared as such was dried at 70° C. for 1 hour. Result of measurement of various characteristics of the above-mentioned microblend is shown in Table 1 under the sample 7.

(Adjustment of Molecular Weight)

Antioxidant (0.2 part by weight) and 0.05 part by weight of 1,3-bis(tert-butylperoxyisopropyl)benzene as an organic peroxide were added to and mixed with the above-mentioned microblend and subjected to an extrusion molding at 230° C. to give pellets where molecular weight was reduced.

Result of measurement of various characteristics of the microblend prepared as such is shown in Table 1 under the sample 1.

Sample 2:

Microblend was manufactured in a similar manner as the manufacturing method for the sample 1 except that supplying amount of ethylene and supplying amount of hydrogen were changed and microblend where molecular weight was adjusted (sample 2) was prepared by the same manner as in the manufacturing method for the sample 1.

Result of measurement of various characteristics of the microblend prepared as such is shown in Table 1.

Result of measurement of various characteristics of the microblend before decomposition of the sample 2 is shown in Table 1 under the sample 8.

Sample 3:

In the manufacturing method for the sample 1, ethylene gas concentration in the step 1 was made 1.0 mol % and polymerization was carried out at 55° C. for 150 minutes without conducting the step 2 whereupon a random copolymer of propylene with ethylene was prepared. Result of measurement of various characteristics is shown in Table 1.

Sample 4:

Microblend was manufactured using a catalyst of a metallocene type was used as a catalyst and microblend where molecular weight was adjusted (sample 4) was manufactured by the same manner as in the manufacturing method for the sample 1. Result of measurement of various characteristics is shown in Table 1.

Sample 5:

Result of measurement of various characteristics for commercially available TPO comprising commercially available copolymer of ethylene with propylene is shown in Table 1 under the sample 5.

Sample 6:

Commercially available polypropylene (RB 110 manufactured by K. K. Tokuyama) was used. Result of measurement of various characteristics is shown in Table 1.

TABLE 1

| | | Types of Polymers | | | | | | |
|---|---|---|---|---|---|---|---|---|
| | | Propylene-ethylene random copolymer components | TREF*1 eluting | TREF*2 eluting rate 20° C. or | | | Weight-average | |
| Polymers | Types | Rate (wt %) | Rate of ethylene contained (mol %) | rate of −40° C. to 30° C. (wt %) | lower than 20° C. | higher but lower than 100° c. | 100° C. or higher | molecular weight (Mw) [× 10⁴] | MFR (g/10 min) |
| Sample 1 | Microblend | 91 | 36 | 70 | 68 | 23 | 9 | 34 | 1.5 |
| Sample 2 | Microblend | 86 | 26 | 55 | 51 | 35 | 14 | 35 | 1.5 |
| Sample 3 | Random Copolymer | 95 | 6 | 8 | 6 | 10 | 84 | 29 | 1.4 |
| Sample 4 | Microblend | 91 | 89 | 21 | 17 | 74 | 9 | 31 | 2.1 |
| Sample 5 | Microblend | 99.5 | 45 | 96 | 90 | 9.5 | 0.5 | 57 | 0.5 |
| Sample 6 | Propylene Homopolymer | 0 | 0 | 3 | 2 | 3 | 95 | 54 | 0.5 |
| Sample 7 | Polymer of Sample 1 before decomposition | 91 | 36 | 70 | 67 | 24 | 9 | 95 | 0.1 |
| Sample 8 | Polymer of Sample 2 before decomposition | 86 | 26 | 56 | 50 | 36 | 14 | 94 | 0.1 |

*1 o-Dibromobenzene was used
*2 o-Dichlorobenzene was used

Abbreviations of fillers used in Examples and Comparative Examples are shown in Table 2.

TABLE 2

| Abbreviation | Type of Filler |
|---|---|
| A | Synthetic magnesium hydroxide (plates) |
| B | Talc (plates) |

Incidentally, in Table 1, the rate of the propylene-ethylene copolymer component of the propylene-ethylene block copolymer shows the sum of the component (a) eluted at lower than 20° C. and the component (b) eluted at 20° C. or higher but lower than 100° C. fractionated by a temperature-rising elution fractionation method using an o-dichlorobenzene solvent, while ethylene content in the copolymer shows the ethylene content in the above-mentioned propylene-ethylene copolymer.

Example 1

Tetrakis[methylene(3,5-di-tert-butyl-4-hydroxyphenyl) propionate]methane (antioxidant) (0.05 part by weight), 0.9 part by weight of 1,3-bis (tert-butylperoxyisobutyl)benzene and 4.5 parts by weight of maleic acid anhydride were compounded with 100 parts by weight of microblend (sample 7) and the mixture was well stirred and mixed using a Henschel mixer.

After that, kneading upon melting was carried out using a monoaxial extruder of 50 mm diameter followed by strand cutting to give modified microblend.

The resulting microblend had an MFR of 50 g/10 minutes and an organic acid group concentration of 0.29 mmol/g.

After that, microblend, modified microblend and polypropylene in the amounts as shown in Table 3, a filler A (magnesium hydroxide (cross-linking agent)) in an amount as shown in Table 2 and 0.05 part by weight of tetrakis [methylene (3,5-di-tert-butyl-4-hydroxyphenyl)propionate] methane (antioxidant) were compounded therewith followed by subjecting to well stirring and mixing using a Henschel mixer.

Then kneading upon melting was carried out using a biaxial extruder of 45 mm diameter equipped with a vent followed by strand cutting to give a resin composition.

The resin composition prepared as such was molded into an insulated electric wire by the above-mentioned method and subjected to various measurements and evaluations. The result is shown in Tables 4 and 5.

Example 2 to 4

The same operation as in-Example 1 was carried out except that compounding amounts of microblend, modified microblend and magnesium hydroxide were changed as shown in Table 3 to give a resin composition.

An insulated electric wire was prepared using the resin composition manufactured as such and the result of various measurements and evaluations is shown in Tables 4 and 5.

Example 5

Tetrakis[methylene(3,5-di-tert-butyl-4-hydroxyphenyl) propionate]methane (antioxidant) (0.05 part by weight), 0.9 part by weight of 1,3-bis (tert-butylperoxyisobutyl)benzene and 4.5 parts by weight of maleic acid anhydride were compounded with 100 parts by weight of microblend (sample 8) and the mixture was well stirred and mixed using a Henschel mixer.

After that, kneading upon melting was carried out using a monoaxial extruder of 50 mm diameter followed by strand cutting to give modified microblend.

The resulting microblend had an MFR of 107 g/10 minutes and an organic acid group concentration of 0.20 mmol/g.

After that, microblend (sample 1), the above-mentioned modified microblend and magnesium hydroxide (cross-linking agent) in the amounts as shown in Table 3 and 0.05 part by weight of tetrakis[methylene (3,5-di-tert-butyl-4-hydroxyphenyl)propionate]methane (antioxidant) were compounded therewith followed by subjecting to well stirring and mixing using a Henschel mixer.

Then kneading upon melting was carried out using a biaxial extruder of 45 mm diameter equipped with a vent followed by strand cutting to give a resin composition.

The resin composition prepared as such was molded into an insulated electric wire by the above-mentioned method and subjected to various measurements and evaluations. The result is shown in Tables 4 and 5.

Comparative Examples 1 to 7

The same operation as in Example 1 was carried out except that modified microblend and random polymer or microblend, polypropylene and magnesium hydroxide were compounded in the amounts as shown in Table 4 to give insulated electric wire.

TABLE 3

| | Resin Composition | | | | | | | | | | | | |
|---|---|---|---|---|---|---|---|---|---|---|---|---|---|
| | Mixture | | | | | | Filler | | | | | | |
| | Microblend (Unmodified) | | Modified Microblend | | Concentration of Org Acid Group | Polypropylene | | | Compounded amount*3 | Average fiber diameter or average particle size (μm) | Aspect ratio | MFR (g/10 min) | Modulus of elasticity in flexure (MPa) | Amount of Gel (wt %) |
| | Type | Rate (wt %) | Type*1 | Rate (wt %) | (mmol/g) | Type | Compounded amount*2 (parts by wt) | Type | (parts by wt) | | | | | |
| Example 1 | Sample 1 | 50 | Sample 7 | 50 | 0.14 | Sample 6 | 100 | A | 100 | 1.2 | 5 | ≦0.01 | 700 | 35 |
| Example 2 | Sample 2 | 50 | Sample 7 | 50 | 0.14 | Sample 6 | 100 | A | 100 | 1.2 | 5 | ≦0.01 | 750 | 36 |
| Example 3 | Sample 1 | 67 | Sample 7 | 33 | 0.10 | Sample 6 | 67 | A | 160 | 1.3 | 5 | ≦0.01 | 640 | 33 |
| Example 4 | Sample 1 | 30 | Sample 7 | 70 | 0.17 | Sample 6 | 500 | A | 25 | 1.2 | 5 | ≦0.01 | 1700 | 21 |
| Example 5 | Sample 1 | 50 | Sample 8 | 50 | 0.10 | Sample 6 | 100 | A | 100 | 1.2 | 5 | ≦0.01 | 790 | 32 |

*1Microblend before modification was mentioned
*2Amount to 100 parts by weight of the mixture
*3Amount to 100 parts by weight of sum of microblend resin and polypropylene

TABLE 4

| | Resin Composition | | | | | | | | | | | | |
|---|---|---|---|---|---|---|---|---|---|---|---|---|
| | Mixture | | | | | | Filler | | | | | | |
| | Microblend (Unmodified) | | Modified Microblend | | Concentration of Org Acid Group | Polypropylene | | | | | | Modulus | |
| | Type | Rate (wt %) | Type*1 | Rate (wt %) | (mmol/ g) | Type | Compounded amount*2 (parts by wt) | Type | Compounded amount*3 (parts by wt) | Average fiber diameter or average particle size (μm) | Aspect ratio | MFR (g/10 min) | of elasticity in flexure (MPa) | Amount of Gel (wt %) |
| Comp. Example 1 | Sample 3 | 50 | Sample 7 | 50 | 0.14 | Sample 6 | 100 | A | 100 | 1.2 | 5 | ≦0.01 | 2100 | 19 |
| Comp. Example 2 | Sample 4 | 50 | Sample 7 | 50 | 0.14 | Sample 6 | 100 | A | 100 | 1.2 | 5 | ≦0.01 | 690 | 18 |
| Comp. Example 3 | Sample 5 | 50 | Sample 7 | 33 | 0.14 | Sample 6 | 100 | A | 100 | 1.2 | 5 | ≦0.01 | 680 | 18 |
| Comp. Example 4 | Sample 1 | 95 | Sample 7 | 5 | 0.01 | Sample 6 | 100 | A | 100 | 1.2 | 5 | ≦0.01 | 680 | 2 |
| Comp. Example 5 | Sample 1 | 50 | Sample 7 | 50 | 0.14 | Sample 6 | 800 | A | 100 | 1.2 | 5 | ≦0.01 | 2800 | 7 |
| Comp. Example 6 | Sample 1 | 50 | Sample 7 | 50 | 0.14 | Sample 6 | 100 | A | 230 | 1.2 | 5 | ≦0.01 | 2300 | 14 |
| Comp. Example 7 | Sample 1 | 50 | Sample 7 | 50 | 0.14 | Sample 6 | 100 | B | 100 | 4.0 | 11 | ≦0.01 | 700 | 0.1 |

*1) Microblend before modification was mentioned
*2) Amount to 100 parts by weight of the mixture
*3) Amount to 100 parts by weight of sum of microblend resin and polypropylene

TABLE 5

Measured Items for Physical Properties of Insulated electric wire

| | Resistance against Whitening | Abrasion Resistance | Productivity (Wire Extruding Property) | Heat Resistance (Deformation by Heating) |
|---|---|---|---|---|
| Example 1 | ○ | ○ | ○ | ○ |
| Example 2 | ○ | ○ | ○ | ○ |
| Example 3 | ○ | ○ | ○ | ○ |
| Example 4 | ○ | ○ | ○ | ○ |
| Example 5 | ○ | ○ | ○ | ○ |
| Comp. Ex. 1 | x | ○ | ○ | ○ |
| Comp. Ex. 2 | ○ | x | ○ | x |
| Comp. Ex. 3 | ○ | x | ○ | x |
| Comp. Ex. 4 | x | x | x | ○ |
| Comp. Ex. 5 | x | x | ○ | ○ |
| Comp. Ex. 6 | x | x | x | ○ |
| Comp. Ex. 7 | x | x | ○ | x |

Although the present invention was illustrated in detail and by referring to specific embodiments, it is apparent for persons skilled in the art that various alterations and modifications are able to be applied without deviating from spirit and scope of the present invention.

The present invention is on the basis of the Japanese patent application (Patent Application No. 2001-111686) filed on Apr. 10, 2001 and its content is incorporated herein as a reference.

Industrial Applicability

As will be understood from the above illustrations, in the insulated electric wire of the present invention, a resin composition which is a specific soft polyolefin composition is used as an insulating material and coats the conductor whereby, although it has the same or even better resistance against dielectric breakdown, bending property, water resistance and oil resistance as compared with insulated electric wire using a soft vinyl chloride resin, it is able to achieve better properties of anti-scrape property, resistance against deformation by heating where the insulating material does not melt by heat caused by overcurrent and resistance against whitening by bending as compared with not only insulated electric wire of a PE type but also insulated electric wire comprising PVC and, in addition, its productivity in the manufacture of insulated electric wire by extrusion molding is excellent as well.

What is claimed is:

1. An insulated electric wire, wherein a conductor is coated with an insulating material which substantially comprises a resin composition comprising the following components (A), (B) and (C) and wherein a modulus of elasticity in flexure of the resin composition is not more than 2,000 Mpa:

(A) 100 parts by weight of a mixture of a microblend and a modified microblend, wherein the microblend comprises 1 to 70% by weight of polypropylene and 99 to 30% by weight of a propylene-ethylene random copolymer comprising 15 to 50 mol % of ethylene polymerization unit and 85 to 50 mol % of propylene polymerization unit, and wherein total eluted components fractionated by a temperature-rising elution fractionation method using o-dichlorobenzene as a solvent comprises (a) 20 to 80% by weight of a component eluted at −40° C. or higher but lower than +20° C., (b) 10 to 70% by weight of a component eluted at +20° C. or higher but lower than +100° C. and (c) 1 to 40% by weight of a component eluted at +100° C. or higher, wherein the sum of the component (a), the component (b) and the component (c) is 100% by weight, wherein the modified microblend is prepared by bonding an organic acid group to the microblend, wherein concentration of the organic acid group in the mixture is 0.01 to 1 mmol per 1 g of the total microblend, and the total microblend contains 10 to 90% by weight of a component eluted at −40° C. to +30° C. in the total eluted components fractionated by the temperature-rising elution fractionation method using o-dibromobenzene as a solvent, (B) not more than 700 parts by weight of polypropylene, and (C) 5 to 200 parts by weight of an ion cross-linking filler based on 100 parts by weight of the total amount of the component (A) and the component (B).

2. The insulated electric wire according to claim 1, wherein the mixture of the microblend and the modified microblend in the component (A) is a mixture of 10 to 90% by weight of the microblend and 90 to 10% by weight of the modified microblend.

3. The insulated electric wire according to claim 2, wherein the ion cross-linking filler is magnesium hydroxide.

4. The insulated electric wire according to claim 1 or 2, wherein the resin composition contains gel in an amount of 10 to 80% by weight.

5. The insulated electric wire according to claim 3, wherein the ion cross-linking filler is magnesium hydroxide.

6. The insulated electric wire according to claim 1, wherein the ion cross-linking filler is magnesium hydroxide.

* * * * *